US010777003B2

(12) United States Patent
Jiang et al.

(10) Patent No.: US 10,777,003 B2
(45) Date of Patent: *Sep. 15, 2020

(54) NETWORK, SYSTEM AND METHOD FOR 3D SHAPE GENERATION

(71) Applicant: Fudan University, Shanghai (CN)

(72) Inventors: Yugang Jiang, Shanghai (CN); Yanwei Fu, Shanghai (CN); Nanyang Wang, Shanghai (CN); Yinda Zhang, Shanghai (CN); Zhuwen Li, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,304

(22) Filed: Jul. 23, 2019

(65) Prior Publication Data

US 2020/0027269 A1     Jan. 23, 2020

(30) Foreign Application Priority Data

Jul. 23, 2018    (CN) .......................... 2018 1 0809452

(51) Int. Cl.
*G06T 17/20*     (2006.01)
*G06T 17/10*     (2006.01)
*G06T 19/20*     (2011.01)
*G06N 3/08*      (2006.01)

(52) U.S. Cl.
CPC ............... *G06T 17/20* (2013.01); *G06N 3/08* (2013.01); *G06T 17/10* (2013.01); *G06T 19/20* (2013.01)

(58) Field of Classification Search
None
See application file for complete search history.

(56) References Cited

U.S. PATENT DOCUMENTS

2016/0379041 A1*   12/2016   Rhee .................. G06K 9/00208
382/118

* cited by examiner

*Primary Examiner* — Michelle Chin
(74) *Attorney, Agent, or Firm* — Brad Bertoglio; Intelink Law Group, P.C.

(57) ABSTRACT

This invention is related to a network for generating 3D shape, including an image feature network, an initial ellipsoid mesh, and a cascaded mesh deformation network. The image feature network is a Visual Geometry Group Net (VGGN) containing five successive convolutional layer groups, and four pooling layers sandwiched by the five convolutional layer groups; and the cascaded mesh deformation network is a graph-based convolution network (GCN) containing three successive deformation blocks, and two graph unpooling layers sandwiched by the three successive deformation blocks. This invention is also related to a system and a method thereof.

13 Claims, 4 Drawing Sheets
(4 of 4 Drawing Sheet(s) Filed in Color)

(a) Graph Unpooling  (b) Comparison between face-based and edge-based unpooling

NETWORK, SYSTEM AND METHOD FOR 3D SHAPE GENERATION

This invention claims a priority to China application No. 201810809452.2, filed on Jul. 23, 2018; the entire content of which is incorporated herein by reference.

TECHNICAL FIELD

This invention is related to a network for 3D shape generation, and more particularly, for generating 3D shape in triangle mesh from a single color image. This invention is also related to a system and a method thereof.

BACKGROUND

Inferring 3D shape from a single perspective is a fundamental human vision functionality but is extremely challenging for computer vision. Limited by the nature of deep neural network, previous methods usually represent a 3D shape in volume or point cloud, and it is non-trivial to convert them to the more ready-to-use mesh model.

"Multiple View Geometry in Computer Vision" (Hartley etc., Cambridge University Press, 2004) has disclosed 3D reconstruction based on the multi-view geometry. "Structure-from-motion revisited" (Schoenberger et al., CVPR, 2016) has disclosed structure from motion (SfM) for large-scale high-quality reconstruction and simultaneous localization and mapping (SLAM) for navigation. Both documents are restricted by firstly the coverage that the multiple views can give and secondly the appearance of the object to reconstruct. The former restriction means MVG cannot reconstruct unseen parts of the object, and thus it usually takes a long time to get enough views for a good reconstruction; the latter restriction means MVG cannot reconstruct non-lambertian (e.g. reflective or transparent) or textureless objects. These restrictions lead to the trend of resorting to learning based approaches.

Learning based approaches usually consider single or few images, as it largely relies on the shape priors that it can learn from data. Most recently, with the success of deep learning architectures and the release of large-scale 3D shape datasets such as "ShapeNet", learning based approaches have achieved great progress. "Single-view reconstruction via joint analysis of image and shape collections" (Huang et al., ACM Trans. Graph. 34(4), 87:1-87:10, 2015) and "Estimating image depth using shape collections" (Su et al., ACM Trans. Graph. 33(4), 37:1-37:11, 2014) have disclosed how to retrieve shape components from a large dataset, assemble them and deform the assembled shape to fit the observed image. However, shape retrieval from images itself is an illposed problem. To avoid this problem, "Category-specific object reconstruction from a single image" (Kar et al., CVPR, 2015) has disclosed how to learn a 3D deformable model for each object category and capture the shape variations in different images. But the reconstruction is still limited to the popular categories and its reconstruction result is usually lack of details.

Another line of research is to directly learn 3D shapes from single images. Restricted by the prevalent grid-based deep learning architectures, most works outputs 3D voxels, which are usually with low resolutions due to the memory constraint on a modern GPU. "Octree generating networks: Efficient convolutional architectures for high-resolution 3d outputs" (Tatarchenko et al., ICCV, 2017) have disclosed an octree representation, which allows to reconstructing higher resolution outputs with a limited memory budget. However, a 3D voxel is still not a popular shape representation in game and movie industries. "A point set generation network for 3d object reconstruction from a single image" (Fan et al., CVPR, 2017) has disclosed to generate point clouds from single images, to avoid drawbacks of the voxel representation. The point cloud representation has no local connections between points, and thus the point positions have a very large degree of freedom. Consequently, the generated point cloud is usually not close to a surface and cannot be used to recover a 3D mesh directly.

"3d-r2n2: A unified approach for single and multi-view 3d object reconstruction" (Choy et al., ECCV, 2016) and "A point set generation network for 3d object reconstruction from a single image" (Fan et al., CVPR, 2017) have disclosed approaches achieved for 3d shape generation from a single color image using deep learning techniques. In these two documents, with the usage of convolutional layers on regular grids or multi-layer perception, the estimated 3D shape, as the output of the neural network, is represented as either a volume ("Choy") or point cloud ("Fan"). However, both of them lose important surface details, and are non-trivial to reconstruct a surface model, i.e. a mesh, which is more desirable for many real applications since it is lightweight, capable of modelling shape details, easy to deform for animation, to name a few.

There is a need to provide a new and different mechanism to extract a 3D triangular mesh from a single color image.

SUMMARY

In one aspect of this invention, it is provided a network for generating 3D shape, including an image feature network containing successively five convolutional layer groups, and four pooling layers sandwiched by the five convolutional layer groups;

an initial ellipsoid mesh, and a cascaded mesh deformation network containing successively three deformation blocks, and two graph unpooling layers sandwiched by the three successive deformation blocks;

wherein the first convolutional layer group contains two successive convolutional layers each having a 3×3 the convolutional kernel size and 64 channels; the second convolutional layer group contains two successive convolutional layers each having a 3×3 the convolutional kernel size and 128 channels; the third convolutional layer group contains three successive convolutional layers each having a 3×3 the convolutional kernel size and 256 channels; the fourth convolutional layer group contains three successive convolutional layers each having a 3×3 the convolutional kernel size and 512 channels; and the fifth convolutional layer group also contains three successive convolutional layers each having a 3×3 the convolutional kernel size and 512 channels;

the four pooling layers each has a 2×2 pooling core size; the initial ellipsoid mesh is centered at 0.8 m in front of a camera, and the radius of its three axis is respectively 0.2 m, 0.2 m, and 0.4 m; wherein the camera represents a coordinates system in which its original position is the view point; the deformation blocks each comprises a perceptual feature pooling layer, a graph based ResNet (G-ResNet) consisting of 14 graph residual convolutional layers with 128 channels, and a loss module calculating an overall loss (lall) that is a weighted sum of the Chamfer loss (lc), the normal loss (ln), the Laplacian regularization (llap), and the edge length regularization (lloc) in accordance the formula lall=lc+1.6e⁻4*ln+0.3*llap+0.1*lloc; and the graph unpooling layer each is an edge-based unpooling layer in which a vertex is added at the center of each edge of the input mesh and the 3D feature of the newly added vertex is set as the average of the two end points of the edge, and thus the three vertices added on a same original triangle are connected to create four new triangles from the original triangle.

In another aspect of this invention, it is provided a network for generating 3D shape, including
an image feature network containing five successive convolutional layer groups, and four pooling layers sandwiched by the five convolutional layer groups
an initial ellipsoid mesh, and
a cascaded mesh deformation network containing three successive deformation blocks, and two graph unpooling layers sandwiched by the three successive deformation blocks; wherein the first convolutional layer group contains two successive first type convolutional layers; the second convolutional layer group contains two successive second type convolutional layers; the third convolutional layer group contains three successive third type convolutional layers; the fourth convolutional layer group contains three successive fourth type convolutional layers; and the fifth convolutional layer group also contains three successive fourth type convolutional layers;
the four pooling layers are identical;
each of the deformation blocks comprises
a perceptual feature pooling layer,
a graph based ResNet (G-ResNet), and
a loss module calculating an overall loss that is a weighted sum of the Chamfer loss, the normal loss, the Laplacian regularization, and the edge length regularization; and
each of the graph unpooling layers is an edge-based unpooling layer.

In yet another aspect of this invention, it is provided a network for generating 3D shape, including
an image feature network,
an initial ellipsoid mesh, and
a cascaded mesh deformation network;
wherein the image feature network is a Visual Geometry Group Net (VGGN) containing five successive convolutional layer groups, and four pooling layers sandwiched by the five convolutional layer groups; and
the cascaded mesh deformation network is a graph-based convolution network (GCN) containing three successive deformation blocks, and two graph unpooling layers sandwiched by the three successive deformation blocks.

In a further aspect of this invention, it is provided a system for generating 3D shape, including an input device, a processor for processing the input data, and an output device for outputting the processed data; wherein the processor is configured to build a computing model including
an image feature network,
an initial ellipsoid mesh, and
a cascaded mesh deformation network;
wherein the image feature network is a Visual Geometry Group Net (VGGN) containing five successive convolutional layer groups, and four pooling layers sandwiched by the five convolutional layer groups; and
the cascaded mesh deformation network is a graph-based convolution network (GCN) containing three successive deformation blocks, and two graph unpooling layers sandwiched by the three successive deformation blocks.

In yet a further aspect of this invention, it is provided a method for generating 3D shape, including
inputting the input image to an image feature network containing five successive convolutional layer groups, and four pooling layers sandwiched by the five convolutional layer groups;
inputting an initial ellipsoid mesh to a cascaded mesh deformation network containing three successive deformation blocks, and two graph unpooling layers sandwiched by the three successive deformation blocks;
perceiving and pooling features from the features of the third layers of the third, fourth, fifth convolutional layer groups, and inputting them to each deformation block;
outputting the output of the cascaded mesh deformation network.

Preferably, the first convolutional layer group contains two successive first type convolutional layers; the second convolutional layer group contains two successive second type convolutional layers; the third convolutional layer group contains three successive third type convolutional layers; the fourth convolutional layer group contains three successive fourth type convolutional layers; and the fifth convolutional layer group also contains three successive fourth type convolutional layers.

Preferably, the first, second, third, and fourth type convolutional layers all have identical size of the convolutional kernel.

Preferably, the identical size of the convolutional kernel is 3×3.

Preferably, the second type convolutional layer has a number of channels as double as that of the first type convolutional layer; the third type convolutional layer has a number of channels as double as that of the second type convolutional layer; and the fourth type convolutional layer has a number of channels as double as that of the third type convolutional layer.

Preferably, the number of channels of the first type convolutional layer is 64.

Preferably, the four pooling layers are identical.

Preferably, the four pooling layers have an identical size of the pooling core, which is 2×2.

Preferably, the initial ellipsoid mesh is centered at 0.8 m in front of a camera; wherein the camera represents a coordinates system in which its original position is the view point.

Preferably, the radius of three axis of the initial ellipsoid mesh is respectively 0.2 m, 0.2 m, and 0.4 m.

Preferably, each of the deformation blocks comprises a perceptual feature pooling layer, a graph based ResNet (G-ResNet), and a loss module.

Preferably, in each deformation block, the pooled perceptual feature is concatenated with the 3D shape feature attached on the vertex from the input graph and fed into the G-ResNet.

Preferably, the G-ResNet of each deformation block has the same structure, which consists of 14 graph residual convolutional layers with 128 channels.

Preferably, the loss module comprises sub-modules for a Chamfer loss, a normal loss, a Laplacian regularization, and an edge length regularization.

Preferably, the overall loss is a weighted sum of the Chamfer loss, the normal loss, the Laplacian regularization, and the edge length regularization.

Preferably, the weight of Chamfer loss is 1, the weight of normal loss is $1.6e^{-4}$, the weight of Laplacian regularization is 0.3, and the weight of edge length regularization is 0.1.

Preferably, the graph unpooling layer is an edge-based unpooling layer.

Preferably, in the edge-based unpooling layer, a vertex is added at the center of each edge of the input mesh and the 3D feature of the newly added vertex is set as the average of the two end points of the edge, wherein the three vertices added on a same original triangle are connected to create four new triangles from the original triangle.

This application has provided a much improved approach to extract 3D triangular meshes from singe images. Compared with the prior art using other shape representations such as 3D volume or 3D point cloud, this invention achieves a significantly better result. Our result is not restricted by the resolution due to the limited memory budget and contains both smooth continuous surface and local details. It outperforms the prior art methods in most categories and achieves the best mean score.

BRIEF DESCRIPTION OF DRAWINGS

The patent or application file contains at least one drawing executed in color. Copies of this patent or patent application publication with color drawing(s) will be provided by the Office upon request and payment of the necessary fee.

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

Wherein.

EMBODIMENTS

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation-specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

Figure 1:
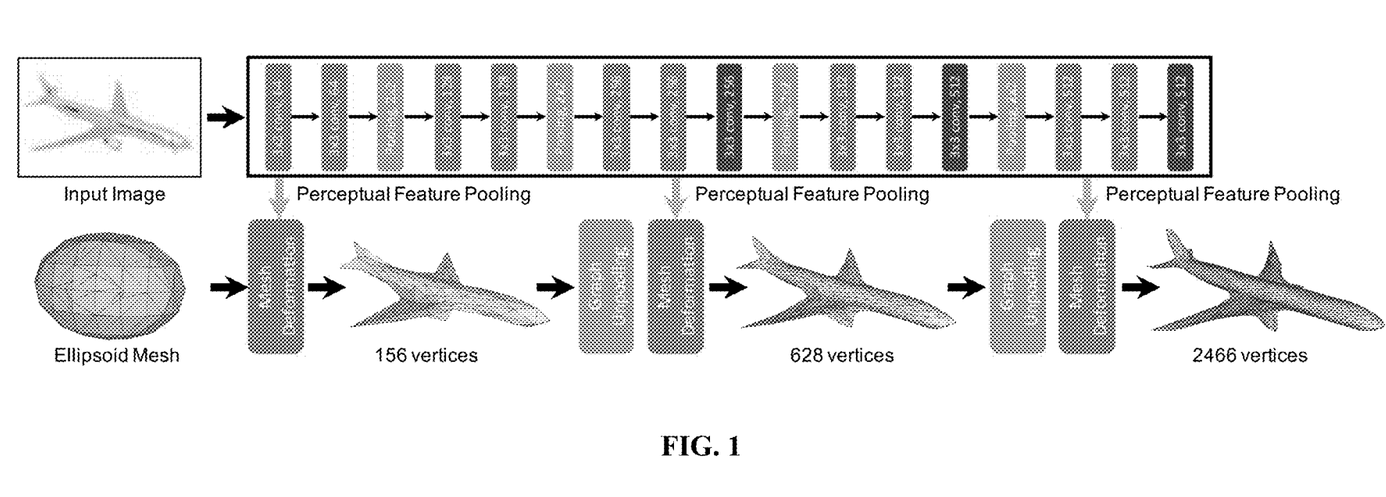
FIG. 1 shows a 3D shape generation network of an embodiment according to this invention.

FIG. 1 shows a 3D shape generation network of an embodiment according to this invention. The network consists an image feature network, an initial ellipsoid mesh and a cascaded mesh deformation network.

The image feature network is a 2D convolutional neural network (CNN) that extract perceptual feature from the input image, which is leveraged by the mesh deformation network to progressively deform an ellipsoid mesh into the desired 3D model.

As can be seen from FIG. 1, the image feature network in this embodiment is realized as a VGG (Visual Geometry Group) Net disclosed in "Very deep convolutional networks for large-scale image recognition" (Simonyan, et al., ICLR, 2015). The VGG Net contains five successive convolutional layer groups, and four pooling layers sandwiched by the five convolutional layer groups.

The first convolutional layer group contains two successive (3×3, 64) convolutional layers, wherein "3×3" (the unit is pixel but normally it is omitted) refers to the size of the convolutional kernel and 64 is the number of the channels. As can be seen in FIG. 1, such a layer can also be marked as "3×3 conv, 64". The skilled person in the art will understand, there are other representations for the layer, for example, "conv 3-64".

Subsequent to the first convolutional layer group, there is the first 2×2 pooling layer, wherein 2×2 refers to the size of the pooling core.

Subsequent to the first pooling layer, there are successively the second convolutional layer group, which contains two successive (3×3, 128) convolutional layers, the second 2×2 pooling layer, the third convolutional layer group containing three successive (3×3, 256) convolutional layers, the third 2×2 pooling layer, the fourth convolutional layer group containing three successive (3×3, 512) convolutional layers, the fourth 2×2 pooling layer, and the fifth convolutional layer group also containing three successive (3×3, 512) convolutional layers.

In the embodiment shown in FIG. 1, the initial ellipsoid having average size is placed at a common location in the camera coordinate. Here the camera represents a coordinates system the original position of which is the view point. The initial ellipsoid is centered at 0.8 m in front of the camera with 0.2 m, 0.2 m, and 0.4 m as the radius of three axis. However, a skilled person in the art will understand that other suitable parameters for the location of the initial ellipsoid are also available.

The mesh model is generated by implicit surface algorithm as disclosed in "Meshlab:an open-source mesh processing tool" (Cignoni et al., Eurographics Italian Chapter Conference, 2008) and contains 156 vertices. In this embodiment, the initial feature contains only the 3D coordinate of each vertex.

The cascaded mesh deformation network is a graph-based convolution network (GCN), which contains three deformation blocks intersected by two graph unpooling layers, i.e., successively a first mesh deformation block, a first graph unpooling layer, a second mesh deformation block, a second graph unpooling layer, and a third mesh deformation block.

Each deformation block takes an input graph representing the current mesh model with the 3D shape feature attached on vertices, and produces new vertices locations and features. Whereas the graph unpooling layers increase the number of vertices to increase the capacity of handling details, while still maintain the triangular mesh topology.

As can be seen, after an airplane image is input to the image feature network, the features of the third layers of the third, fourth, fifth convolutional layer group, i.e., the $7^{th}$, $10^{th}$, $13^{th}$ convolutional layer in the whole VGG Net, are perceived and pooled as one of the inputs of the mesh deformation blocks of the cascaded mesh deformation network.

Figure 2:
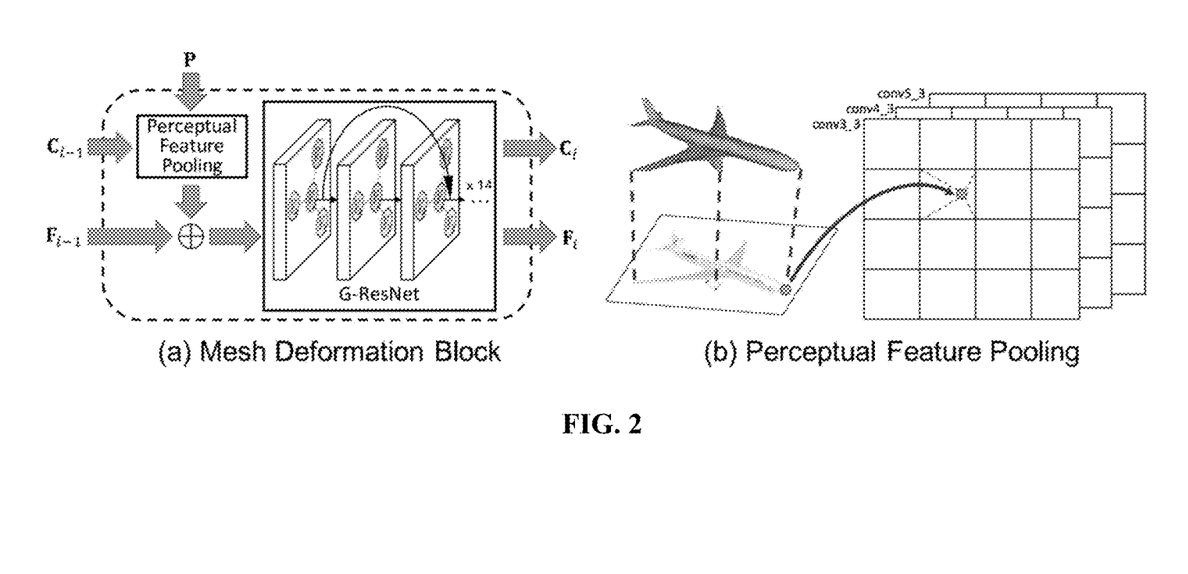
FIG. 2 shows the architecture of mesh deformation block according the one embodiment of this application.

FIG. 2 shows the architecture of mesh deformation block according the one embodiment of this application.

Generally, the mesh deformation block comprises a perceptual feature pooling layer and a G-ResNet, as well as a loss module. In a preferred embodiment, each deformation block is designed identically. However, skilled person in the art will understand that the deformation blocks can be designed differently, as long as not falling out of the scope of this invention.

In order to generate 3D mesh model that is consistent with the object shown in the input image, the deformation block need to pool feature (P) from the input image. This is done in conjunction with the image feature network and a perceptual feature pooling layer given the location of vertex ($C_{i-1}$) in the current mesh model. The pooled perceptual feature is then concatenated with the 3D shape feature attached on the vertex from the input graph ($F_{i-1}$) and fed into a series layers of graph based ResNet (G-ResNet). The G-ResNet produces, also as the output of the mesh deformation block, the new coordinates ($C_i$) and 3d shape feature ($F_i$) for each vertex. As shown in part (a) of FIG. 2, the vertex locations $C_i$ are used to extract image features, which are then combined with vertex features $F_i$ and fed into G-ResNet. The sign "⊕" means a concatenation of the features.

An example of perceptual feature pooling layer is shown in part (b) of FIG. 2, wherein the 3D vertices are projected to the image plane by using camera intrinsics, and perceptual feature is pooled from the 2D-CNN layers by using bilinear interpolation. A VGG-16 architecture up to layer conv5_3 as the image feature network has been used in this embodiment. Given the 3D coordinate of a vertex, its 2D projection on input image plane is calculated by using camera intrinsics, and then the feature is pooled from four nearby pixels by using bilinear interpolation. In particular, in the preferable embodiment, feature extracted from layer 'conv3_3', 'conv4_3', and 'conv5_3' is concatenated, which results in a total dimension of 1280. This perceptual feature is then concatenated with the 128-dim 3D feature from the input mesh, which results in a total dimension of 1408, as shown in part (b) of FIG. 2. Please note that in the first block, the perceptual feature is concatenated with the 3-dim feature (coordinate) since there is no learnt shape feature at the beginning.

In the graph based convolution algorithm, a 3D mesh is a collection of vertices, edges and faces that defines the shape of a 3D object; it can be represented by a graph $\mathcal{M}=(v, \varepsilon, F)$, where $v=\{v_i\}_{i=1}^N$ is the set of N vertices in the mesh, $\varepsilon=\{e_i\}_{i=1}^E$ is the set of E edges with each connecting two vertices, and $F=\{f_i\}_{i=1}^N$ are the feature vectors attached on vertices.

A graph based convolutional layer is defined on irregular graph as:

$$f_p^{l+1} = w_0 f_p^l + \sum_{q \in N(p)} w_1 f_q^l \quad (1)$$

where $f_p^l \in \mathbb{R}^{d_l}$, $f_p^{l+1} \in \mathbb{R}^{d_{l+1}}$ are the feature vectors on vertex p before and after the convolution, and N(p) is the neighboring vertices of p;

$\omega_0$ and $\omega_1$ are the learnable parameter matrices of $d_l \times d_{l+1}$ that are applied to all vertices.

Because $\omega_1$ is shared for all edges, formula (1) works on nodes with different vertex degrees.

In this application, the attached feature vector $f_p$ is the concatenation of the 3D vertex coordinate, feature encoding 3D shape, and feature learned from the input color image (if they exist). Running convolutions updates the features, which is equivalent to applying a deformation.

After obtaining 1408-dim feature for each vertex representing both 3D shape and 2D image information, a graph based convolutional neural network is designed to predict new location and 3D shape feature for each vertex. This requires efficient exchange of the information between vertices.

However, as defined in formula (1), each convolution only enables the feature exchanging between neighboring pixels, which severely impairs the efficiency of information exchanging. This is equivalent to the small receptive field issue on 2D CNN.

To solve this issue, in this application it is made a very deep network with shortcut connections, as disclosed in "Deep residual learning for image recognition" (He et al., CVPR, pp. 770-778, 2016), and denote it as G-ResNet (as shown in part (a) of FIG. 2). In this application, the G-ResNet in all blocks preferably has the same structure, which consists of 14 graph residual convolutional layers with 128 channels. The serial of G-ResNet layers produces a new 128-dim 3D feature. In addition to the feature output, there is a branch which applies an extra graph convolutional layer to the last layer features and outputs the 3D coordinates of the vertex.

The mesh deformation block further comprises a loss module (not shown). In this application, four kinds of losses are defined to constrain the property of the output shape and the deformation procedure to guarantee appealing results. The Chamfer loss, as disclosed in "A point set generation network for 3d object reconstruction from a single image" (Fan et al., CVPR, 2017), is adopted to constrain the location of mesh vertices; a normal loss is adopted to enforce the consistency of surface normal, a Laplacian regularization is adopted to maintain relative location between neighboring vertices during deformation, and an edge length regularization is adopted to prevent outliers.

These losses are applied with equal weight on both the intermediate and final mesh.

Unless otherwise stated, in this application p is used for a vertex in the predicted mesh, q for a vertex in the ground truth mesh, and N (p) for the neighboring pixel of p.

The Chamfer loss (also "Chamfer distance") measures the distance of each point to the other set:

$$l_c = \Sigma_p \min_q \|p-q\|_2^2 + \Sigma_q \min_p \|p-q\|_2^2 \quad (2)$$

It is reasonably good to regress the vertices close to its correct position, however is not sufficient to produce nice 3D mesh (see "A point set generation network for 3d object reconstruction from a single image", Fan et al. CVPR, 2017).

Normal loss is further defined on surface normal to characterize high order properties:

$$l_n = \Sigma_p \Sigma_{q=arg\ min_q(\|p-q\|_2^2)} \|\langle p-k, n_q \rangle\|_2^2, \text{ s.t. } k \varepsilon \mathcal{N}(p) \quad (3)$$

where q is the closest vertex for p that is found when calculating the chamfer loss, k is the neighboring pixel of p, $\langle \cdot, \cdot \rangle$ is the inner product of two vectors, and $n_q$ is the observed surface normal from ground truth.

This loss requires the edge between a vertex with its neighbors to be perpendicular to the observed surface normal from the ground truth. One may find that this loss does not equal to zero unless on a planar surface. However, optimizing this loss is equivalent to forcing the normal of a locally fitted tangent plane to be consistent with the observation, which works practically well in our experiment. Moreover, this normal loss is fully differentiable and easy to optimize.

Even with the Chamfer loss and Normal loss, the optimization is easily stucked in some local minimum. More specifically, the network may generate some super large deformation to favor some local consistency, which is especially harmful at the beginning when the estimation is far from ground truth, and causes flying vertices.

To overcome these problems, it is proposed a Laplacian term to prevent the vertices from moving too freely, which potentially avoids mesh self-intersection. The Laplacian term serves as a local detail preserving operator, that encourages neighboring vertices to have the same movement. In the first deformation block, it acts like a surface smoothness term since the input to this block is a smooth-everywhere ellipsoid; starting from the second block, it prevents the 3D mesh model from deforming too much, so that only fine-grained details are added to the mesh model. To calculate this loss, it is defined a Laplacian coordinate for each vertex p as $$\delta_p = p - \sum_{k \in \mathcal{N}(p)} \frac{1}{\|\mathcal{N}(p)\|} k \qquad (4)$$

and the Laplacian regularization is defined as:

$$llap = \Sigma_p \|\delta'_p - \delta_p\|_2^2 \qquad (5)$$

where $\delta'_p$ and $\delta_p$ are the Laplacian coordinate of a vertex after and before a deformation block.

To penalize flying vertices, which usually cause long edge, it is further added an edge length regularization loss:

$$l_{loc} = \Sigma_p \Sigma_{k \in \mathcal{N}(p)} \|p-k\|_2^2 \qquad (6)$$

The overall loss is a weighted sum of all four losses, $$lall = lc + \lambda_1 ln + \lambda_2 llap + \lambda_3 lloc \qquad (7)$$

In the preferred embodiment, $\lambda_1 = 1.6e^{-4}$, $\lambda_2 = 0.3$, and $\lambda_3 = 0.1$ are the hyper-parameters which balance the losses; and these are fixed for all the experiments (see infra) conducted. However, it is understood to skilled person in the art that other parameters could be used, as long as not falling out of the scope of this invention.

Figure 3:
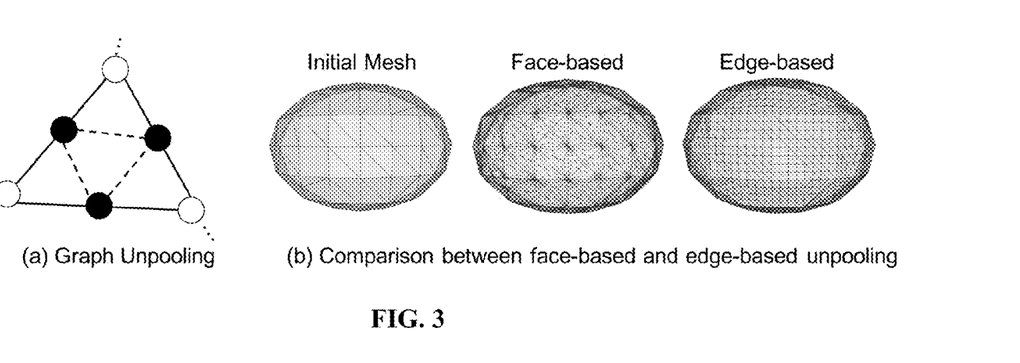
FIG. 3 shows the graph unpooling layer according to one embodiment of this application.

FIG. 3 shows the graph unpooling layer according to one embodiment of this application.

The graph unpooling layer is used to increase the number of vertex in the GCNN (Graphic CNN). It allows to start from a mesh with fewer vertices and add more only when necessary, which reduces memory costs and produces better results. A straightforward approach is to add one vertex in the center of each triangle and connect it with the three vertices of the triangle; this is usually called face-based unpooling. However, this causes imbalanced vertex degrees, i.e. number of edges on vertex.

In this application, as shown in part (a) of FIG. 3, a vertex is added at the center of each edge and connected with the two end-point of this edge. The 3D feature for newly added vertex is set as the average of its two neighbors. If three vertices are added on the same triangle (see the dashed line) they are also connected. Consequently, four new triangles are created for each triangle in the original mesh, and the number of vertex is increased by the number of edges in the original mesh. In this application, we call this as edge-based unpooling. Compared to the face based unpooling which leads to imbalanced vertex degrees, the edge-based unpooling of this application remains regular and uniformly upsamples the vertices, as shown in the part (b) of FIG. 3.

Experiments

Experiments are made on the model according to this application. Firstly, our model is compared with previous 3D shape generation works for evaluating the reconstruction accuracy; secondly it is also analyzed the importance of each component in our model. Qualitative results on both synthetic and real-world images further show that our model produces triangular meshes with smooth surfaces and still maintains details depicted in the input images.

In the experiments the used dataset is provided as disclosed in the aforementioned Choy's article ("Choy"). The dataset contains rendering images of 50 k models belonging to 13 object categories from ShapeNet (see "ShapeNet: An Information-Rich 3D Model Repository", Chang et al., Tech. Rep. arXiv:1512.03012 [cs.GR], 2015), which is a collection of 3D CAD models that are organized according to the WordNet hierarchy. A model is rendered from various camera viewpoints, and camera intrinsic and extrinsic matrices are recorded. For a fair comparison, we use the same training/testing split as in "Choy".

Evaluation Metric is adopted as the standard 3D reconstruction metric. Firstly points are uniformly sampled from our result and ground truth. Then it is calculated precision and recall by checking the percentage of points in prediction or ground truth that can find a nearest neighbor from the other within certain threshold T. A F-score (see "Tanks and temples: benchmarking large-scale scene reconstruction", Knapitsch et al., ACM Trans. Graph. 36(4), 78:1-78:13, 2017) as the harmonic mean of precision and recall is then calculated. Following the aforementioned Fan's article ("Fan"), it is also reported the Chamfer Distance (CD) and Earth Mover's Distance (EMD). Please note that for F-Score, larger number means better result, while for CD and EMD, smaller number means better result.

It is also realized that the commonly used evaluation metrics for shape generation may not thoroughly reflect the shape quality. They often capture occupancy or point-wise distance rather than surface properties, such as continuity, smoothness, high-order details, for which a standard evaluation metric is barely missing in literature. Thus, it is further recommended to pay attention on qualitative results for better understanding of these aspects.

The presented approach is compared with the most recent single image reconstruction approaches. Specifically, it is compared with two state-of-the-art methods: "Choy" (3D-R2N2) producing 3D volume, and "Fan" (PSG) producing point cloud. Since the metrics are defined on point cloud, PSG can be evaluated directly on its output, our method can be evaluated by uniformly sampling point on surface, and 3D-R2N2 can be evaluated by uniformly sampling point from mesh created using the Marching Cube (see "Marching cubes: A high resolution 3d surface construction algorithm", Lorensen et al., SIGGRAPH, 1987) method.

It is also compared to Neural 3D Mesh Renderer (N3MR) (see "Neural 3d mesh renderer", Kato et al., CVPR, 2018), which is so far the only deep learning based mesh generation model with code public available. For a fair comparison, the models are trained with the same data using the same amount of time.

In the experiments, our network receives input images of size 224×224, and initial ellipsoid with 156 vertices and 462 edges. The network is implemented in Tensorflow and optimized using Adam with weight decay 1e−5. The batch size is 1; the total number of training epoch is 50; the learning rate is initialized as 3e−5 and drops to 1e−5 after 40 epochs. The total training time is 72 hours on a Nvidia Titan X. During testing, our model takes 15.58 ms to generate a mesh with 2466 vertices.

Tab. 1 shows the F-score with different thresholds of different methods; where $\tau=10^{-4}$, and best results under each threshold are bolded.

Our approach outperforms the other methods in all categories except watercraft. Notably, our results are significantly better than the others in all categories under a smaller threshold $\tau$, showing at least 10% F-score improvement. N3MR does not perform well, and its result is about 50% worse than ours, probably because their model only learns from limited silhouette signal in images and lacks of explicit handling of the 3D mesh.

TABLE 1

F-score with different thresholds of different methods

| Threshold Category | $\tau$ | | | | $2\tau$ | | | |
|---|---|---|---|---|---|---|---|---|
| | 3D-R2N2 | PSG | N3MR | Ours | 3D-R2N2 | PSG | N3MR | Ours |
| plane | 41.46 | 68.20 | 62.10 | 71.12 | 63.23 | 81.22 | 77.15 | 81.38 |
| bench | 34.09 | 49.29 | 35.84 | 57.57 | 48.89 | 69.17 | 49.58 | 71.86 |
| cabinet | 49.88 | 39.93 | 21.04 | 60.39 | 64.83 | 67.03 | 35.16 | 77.19 |
| car | 37.80 | 50.70 | 36.66 | 67.86 | 54.84 | 77.79 | 53.93 | 84.15 |
| chair | 40.22 | 41.60 | 30.25 | 54.38 | 55.20 | 63.70 | 44.59 | 70.42 |
| monitor | 34.38 | 40.53 | 28.77 | 51.39 | 48.23 | 63.64 | 42.76 | 67.01 |
| lamp | 32.35 | 41.40 | 27.97 | 48.15 | 44.37 | 58.84 | 39.41 | 61.50 |
| speaker | 45.30 | 32.61 | 19.46 | 48.84 | 57.86 | 56.79 | 32.20 | 65.61 |
| firearm | 28.34 | 69.96 | 52.22 | 73.20 | 46.87 | 82.65 | 63.28 | 83.47 |
| couch | 40.01 | 36.59 | 25.04 | 51.90 | 53.42 | 62.95 | 39.90 | 69.83 |
| table | 43.79 | 53.44 | 28.40 | 66.30 | 59.49 | 73.10 | 41.73 | 79.20 |
| cellphone | 42.31 | 55.95 | 27.96 | 70.24 | 60.88 | 79.63 | 41.83 | 82.86 |
| watercraft | 37.10 | 51.28 | 43.71 | 55.12 | 52.19 | 70.63 | 58.85 | 69.99 |
| mean | 39.01 | 48.58 | 33.80 | 59.72 | 54.62 | 69.78 | 47.72 | 74.19 |

Table 2 shows the CD and EMD on the ShapeNet test set, wherein best results under each threshold are bolded. Please note again that here the smaller number means better result.

Our approach outperforms the other methods in most categories and achieves the best mean score. The major competitor is PSG, which produces a point cloud and has the most freedom; this freedom leads to smaller CD and EMD, however does not necessarily leads to a better mesh model without proper regularization. To demonstrate this, we show the qualitative results to analyze why our approach outperforms the others.

TABLE 2

CD and EMD on the ShapeNet test set

| | CD | | | | EMD | | | |
|---|---|---|---|---|---|---|---|---|
| Category | 3D-R2N2 | PSG | N3MR | Ours | 3D-R2N2 | PSG | N3MR | Ours |
| plane | 0.895 | 0.430 | 0.450 | 0.477 | 0.606 | 0.396 | 7.498 | 0.579 |
| bench | 1.891 | 0.629 | 2.268 | 0.624 | 1.136 | 1.113 | 1.766 | 0.965 |
| cabinet | 0.735 | 0.439 | 2.555 | 0.381 | 2.520 | 2.986 | 17.062 | 2.563 |
| car | 0.845 | 0.333 | 2.298 | 0.268 | 1.670 | 1.747 | 11.641 | 1.297 |
| chair | 1.432 | 0.645 | 2.084 | 0.610 | 1.466 | 1.946 | 11.809 | 1.399 |
| monitor | 1.707 | 0.722 | 3.111 | 0.755 | 1.667 | 1.891 | 14.097 | 1.536 |
| lamp | 4.009 | 1.193 | 3.013 | 1.295 | 1.424 | 1.222 | 14.741 | 1.314 |
| speaker | 1.507 | 0.756 | 3.343 | 0.739 | 2.732 | 3.490 | 16.720 | 2.951 |
| firearm | 0.993 | 0.423 | 2.641 | 0.453 | 0.688 | 0.397 | 11.889 | 0.667 |
| couch | 1.135 | 0.549 | 3.512 | 0.490 | 2.114 | 2.207 | 14.876 | 1.642 |
| table | 1.116 | 0.517 | 2.383 | 0.498 | 1.641 | 2.121 | 12.842 | 1.480 |
| cellphone | 1.137 | 0.438 | 4.366 | 0.421 | 0.912 | 1.019 | 17.649 | 0.724 |
| watercraft | 1.215 | 0.633 | 2.154 | 0.670 | 0.935 | 0.945 | 11.425 | 0.814 |
| mean | 1.445 | 0.593 | 2.629 | 0.591 | 1.501 | 1.653 | 13.386 | 1.380 |

Figure 4:
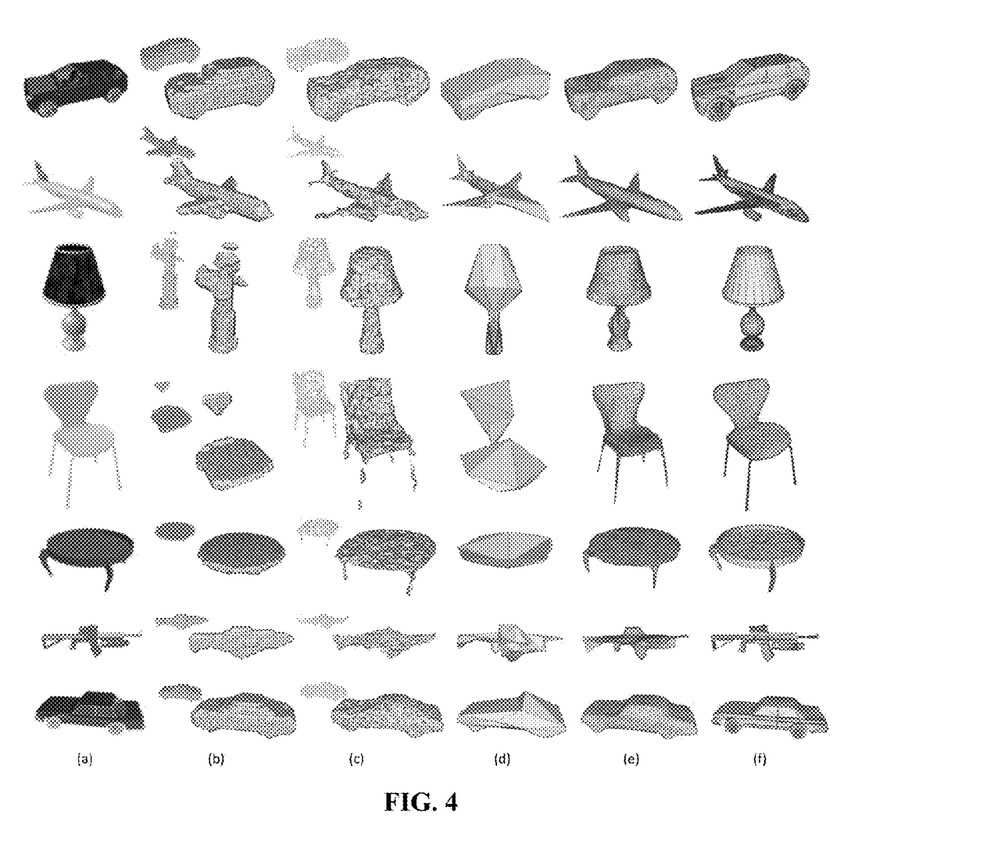
FIG. 4 shows the visual results of the comparison among the approach according to this invention and those of others.

FIG. 4 shows the visual results of the comparison; wherein column (a) shows the input image; column (b) shows the volume from 3D-R2N2, converted using "Marching Cube"; column (c) shows the point cloud from PSG, converted using ball pivoting (see "The ball-pivoting algorithm for surface reconstruction", Bernardini et al., IEEE Trans. Vis. Comput. Graph. 5(4), 349-359, 1999); column (d) shows N3MR; column (e) shows ours; and column (f) shows the ground truth.

To compare the quality of mesh model, it is converted volumetric and point cloud to mesh using standard approaches ("Marching Cube" and "ball pivoting"). As can be seen, the 3D volume results produced by 3D-R2N2 lack of details due to the low resolution, e.g., the legs are missing in the chair example as shown in the $4^{th}$ row of FIG. 4. Even with trying octree based solution (see "Octree generating networks: Efficient convolutional architectures for high-resolution 3d outputs", Tatarchenko et al., ICCV, 2017) to increase the volume resolution, it is still hard to recover surface level details as much as our model. PSG produces sparse 3D point clouds, and it is non-trivial to recover meshes from them. This is due to the applied Chamfer loss acting like a regression loss which gives too much degree of freedom to the point cloud. N3MR produces very rough shape, which might be sufficient for some rendering tasks, however it cannot recover complicated objects such as chairs and tables. In contrast, our model does not suffer from these issues by leveraging a mesh representation, integration of perceptual feature, and carefully defined losses during the training. Our result is not restricted by the resolution due to the limited memory budget and contains both smooth continuous surface and local details.

Ablation study is further conducted to analyze the importance of the components in our model. Table 3 shows the performance of each model by removing one component from the full model, wherein all 4 measurements are reported (2 F-scores, CD and EMD); and FIG. 5 visually shows the qualitative results for ablation study.

TABLE 3

Ablation study results

| Category | -ResNet | -Laplacian | -Unpooling | -Normal | -Edge length | Full model |
|---|---|---|---|---|---|---|
| F (τ)↑ | 55.308 | 60.801 | 60.222 | 58.668 | 60.101 | 59.728 |
| F (2τ)↑ | 71.567 | 75.202 | 76.231 | 74.276 | 76.053 | 74.191 |
| CD↓ | 0.644 | 0.596 | 0.561 | 0.598 | 0.552 | 0.591 |
| EMD↓ | 1.583 | 1.350 | 1.656 | 1.445 | 1.479 | 1.380 |

Again, please note that these commonly used evaluation metrics does not necessarily reflect the quality of the recovered 3D geometry. For example, the model with no edge length regularization achieves the best performance across all, however, in fact it produces the worst mesh (see the last 2nd column in FIG. 5). As such, we use qualitative result in FIG. 5 to show the contribution of each component in our system.

Figure 5:
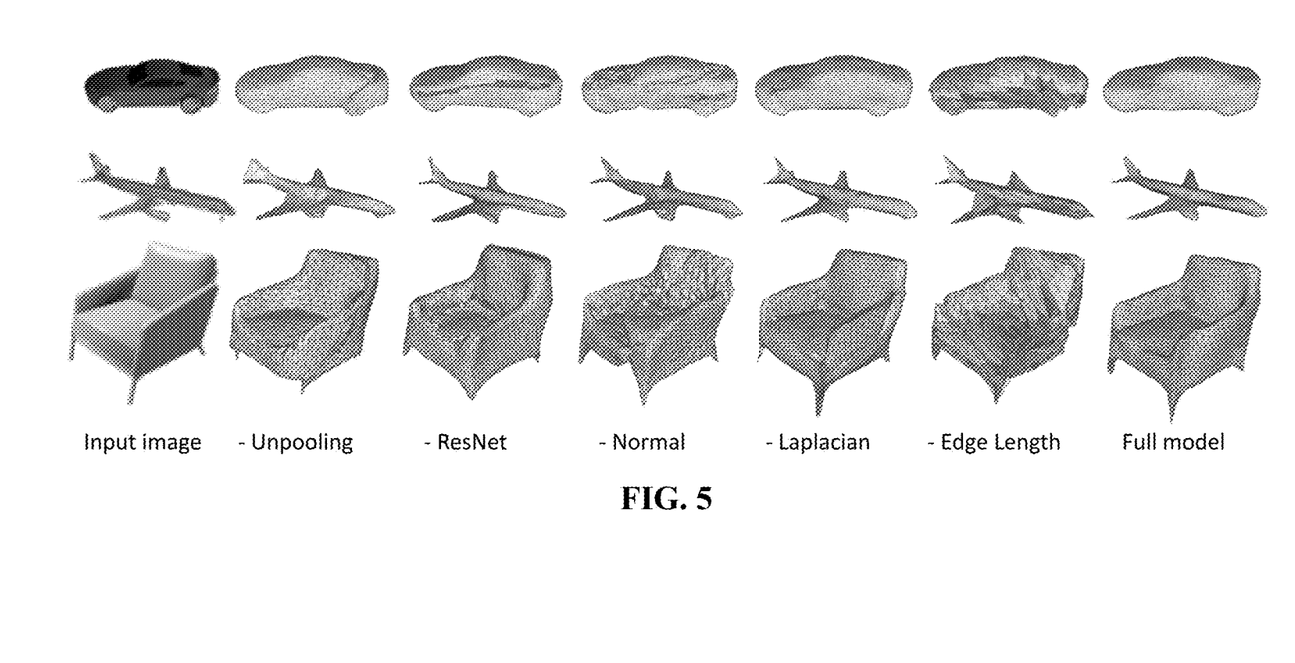
FIG. 5 visually shows the qualitative results for ablation study according to this invention.

The first removed is the graph unpooling layers, and thus each block has the same number of vertices as in the last block of our full model. It is observed that the deformation makes mistake easier at beginning, which cannot be fixed later on. Consequently, there are some obvious artifacts in some parts of the objects.

Secondly, we remove the shortcut connections in G-ResNet, and make it regular GCN. As can be seen from Tab. 3, there is a huge performance gap in all four measurement metrics, which means the failure of optimizing Chamfer distance. The main reason is the degradation problem observed in the very deep 2D convolutional neural network. Such problem leads to a higher training error (and thus higher testing error) when adding more layers to a suitably deep model (see "Deep residual learning for image recognition", He et al., CVPR, pp. 770-778, 2016)). Essentially, our network has 42 graph convolutional layers. Thus, this phenomenon has also been observed in our very deep graph neural network experiment.

Thirdly, the function of each additional loss terms is evaluated except the Chamfer loss. As can be seen in FIG. 5, removing normal loss severely impairs the surface smoothness and local details, e.g. seat back; removing Laplacian term causes intersecting geometry because the local topology changes, e.g. the hand held of the chair; removing edge length term causes flying vertices and surfaces, which completely ruins the surface characteristics. These results demonstrate that all the components presented in this work contribute to the final performance.

Figure 6:
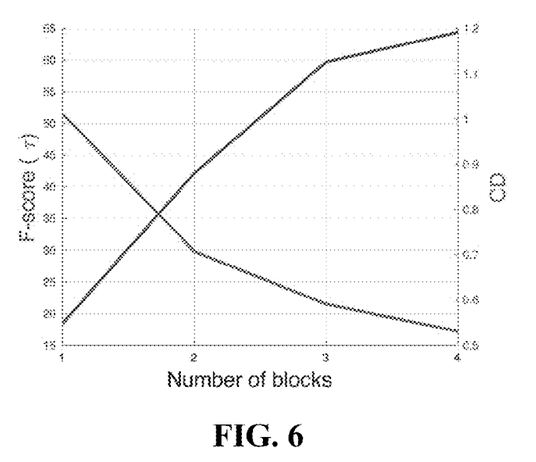
FIG. 6 shows effect of the number of deformation blocks according to this invention.

Fourthly, the effect of the number of deformation blocks is analyzed. FIG. 6 shows Effect of number of blocks; wherein each curve shows the mean F-score (τ) and CD for different number of blocks.

As can be seen, the results indicate that increasing the number of blocks helps, but the benefit is getting saturated with more blocks, e.g. from 3 to 4. In our experiment, it is found that 4 blocks results in too many vertices and edges, which slow down our approach dramatically even though it provides better accuracy on evaluation metrics. Therefore, as also in preferable embodiment, 3 blocks are used in all our experiment for the best balance of performance and efficiency.

Figure 7:
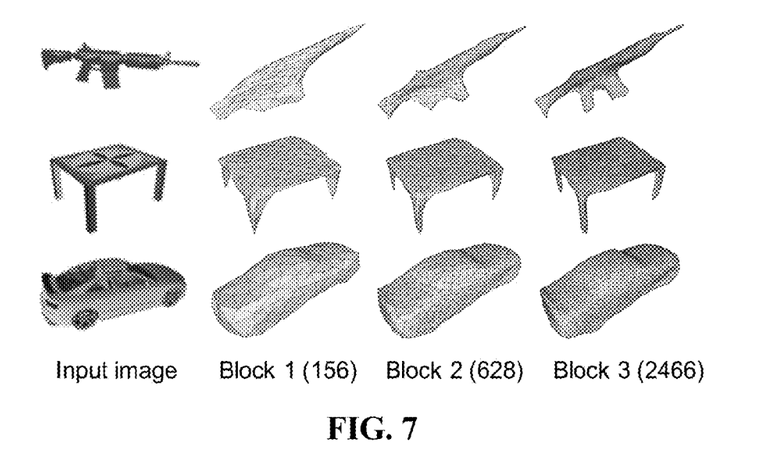
FIG. 7 shows the output after each deformation block according to this invention.

FIG. 7 shows the output of our model after each deformation block, wherein mesh is densified with more vertices and new details are added.

Following "Choy", our network is tested on the Online Products dataset and Internet images for qualitative evaluation on real images. The model trained from ShapeNet dataset is used and directly run on real images without fine-tuning.

Figure 8:
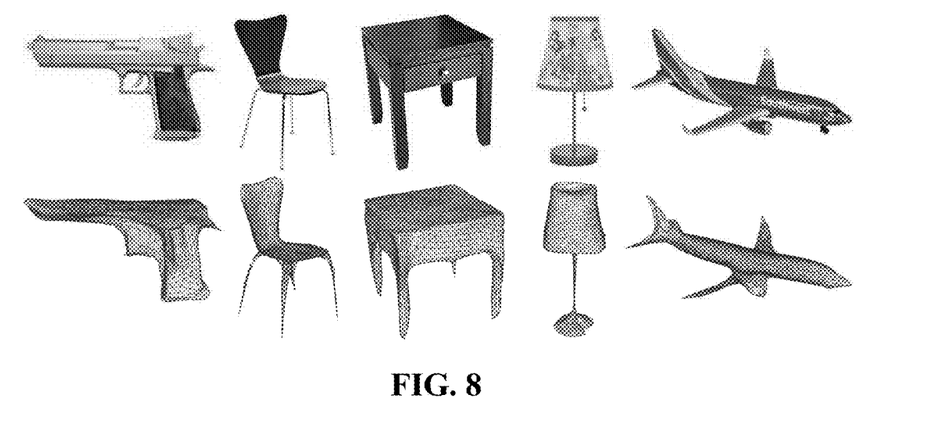
FIG. 8 show the test results of real-world images from the Online Products dataset and Internet when using the model according to this invention.

FIG. 8 show the test results of real-world images from the Online Products dataset and Internet when using our model. As can be seen, our model trained on synthetic data generalizes well to the real-world images across various categories.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A network for generating 3D shape, including
   a) an image feature network,
   b) an initial ellipsoid mesh, and
   c) a cascaded mesh deformation network;
   with the image feature network containing five successive convolutional layer groups, and four pooling layers sandwiched by the five convolutional layer groups; and
   the cascaded mesh deformation network containing three successive deformation blocks, and two graph unpooling layers sandwiched by the three successive deformation blocks;
   wherein the first convolutional layer group contains two successive first type convolutional layers; the second convolutional layer group contains two successive second type convolutional layers; the third convolutional layer group contains three successive third type convolutional layers; the fourth convolutional layer group contains three successive fourth type convolutional layers; and the fifth convolutional layer group also contains three successive fourth type convolutional layers;
   the four pooling layers are identical;
   each of the deformation blocks comprises
      a perceptual feature pooling layer,
      a graph based ResNet (G-ResNet), and
      a loss module calculating an overall loss that is a weighted sum of the Chamfer loss, the normal loss, the Laplacian regularization, and the edge length regularization; and
   each of the graph unpooling layers is an edge-based unpooling layer.

2. The network of claim 1, wherein the first, second, third, and fourth type convolutional layers all have identical size of the convolutional kernel.

3. The network of claim 2, wherein the identical size of the convolutional kernel is 3×3.

4. The network of claim 1, wherein the second type convolutional layer has a number of channels as double as that of the first type convolutional layer; the third type convolutional layer has a number of channels as double as that of the second type convolutional layer; and the fourth type convolutional layer has a number of channels as double as that of the third type convolutional layer.

5. The network of claim 1, wherein the number of channels of the first type convolutional layer is 64.

6. The network of claim 1, wherein the four pooling layers have an identical size of the pooling core, which is 2×2.

7. The network of claim 1, wherein the initial ellipsoid mesh is centered at 0.8 m in front of a camera; wherein the camera represents a coordinates system in which its original position is the view point.

8. The network of claim 1, wherein the radius of three axis of the initial ellipsoid mesh is respectively 0.2 m, 0.2 m, and 0.4 m.

9. The network of claim 1, wherein in each deformation block, the pooled perceptual feature is concatenated with the 3D shape feature attached on the vertex from the input graph and fed into the G-ResNet.

10. The network of claim 1, wherein the G-ResNet of each deformation block has the same structure, which consists of 14 graph residual convolutional layers with 128 channels.

11. The network of claim 1, wherein the weight of Chamfer loss is 1, the weight of normal loss is $1.6e^{-4}$, the weight of Laplacian regularization is 0.3, and the weight of edge length regularization is 0.1.

12. The network of claim 1, wherein in the edge-based unpooling layer, a vertex is added at the center of each edge of the input mesh and the 3D feature of the newly added vertex is set as the average of the two end points of the edge, wherein the three vertices added on a same original triangle are connected to create four new triangles from the original triangle.

13. A system for generating 3D shape, including an input device, a processor for processing the input data, and an output device for outputting the processed data; wherein the processor is configured to build a computing network for generating 3D shape, including d) an image feature network,
e) an initial ellipsoid mesh, and
f) a cascaded mesh deformation network;

with the image feature network containing five successive convolutional layer groups, and four pooling layers sandwiched by the five convolutional layer groups; and the cascaded mesh deformation network containing three successive deformation blocks, and two graph unpooling layers sandwiched by the three successive deformation blocks;

wherein the first convolutional layer group contains two successive first type convolutional layers; the second convolutional layer group contains two successive second type convolutional layers; the third convolutional layer group contains three successive third type convolutional layers; the fourth convolutional layer group contains three successive fourth type convolutional layers; and the fifth convolutional layer group also contains three successive fourth type convolutional layers;

the four pooling layers are identical;

each of the deformation blocks comprises
a perceptual feature pooling layer,
a graph based ResNet (G-ResNet), and
a loss module calculating an overall loss that is a weighted sum of the Chamfer loss, the normal loss, the Laplacian regularization, and the edge length regularization; and each of the graph unpooling layers is an edge-based unpooling layer.

* * * * *